Patented July 10, 1951

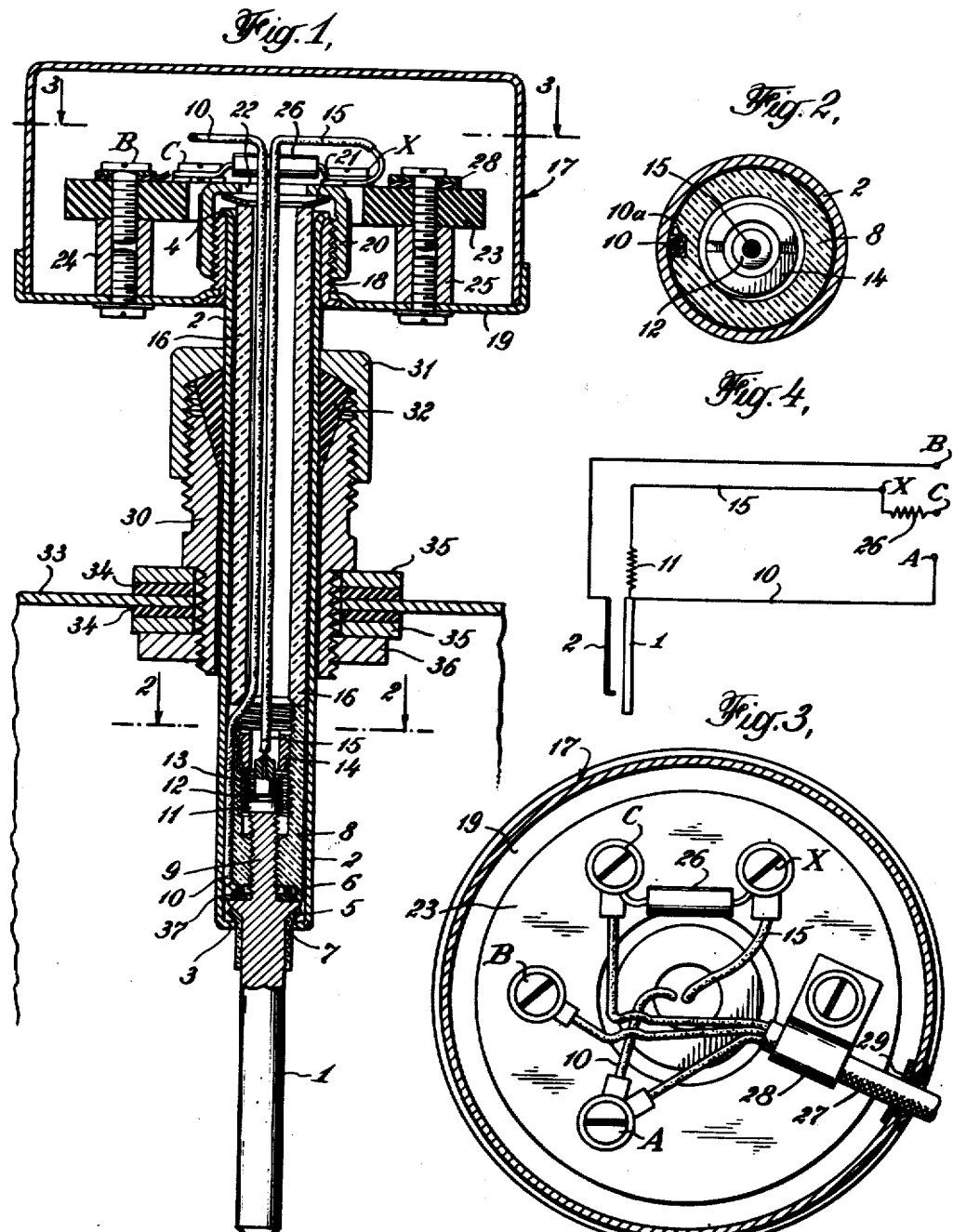

2,560,209

UNITED STATES PATENT OFFICE 2,560,209

CONDUCTIVITY CELL

George L. Borell, Minneapolis, and Marcus I. Nystuen, St. Paul, Minn., assignors to Economics Laboratory, Inc., St. Paul, Minn., a corporation of Delaware Application January 18, 1949, Serial No. 71,418

12 Claims. (Cl. 175—183)

This invention relates to conductivity cells which respond to changes in the conductivity of fluids. The cell of the present invention is especially useful in connection with apparatus for indicating changes in and controlling the concentration of solutions, such for instance, as described in our co-pending application for U. S. Letters Patent, Serial No. 81,856, filed March 17, 1949.

In many commercial processes and machines, of which dish washing machines comprise a typical example, it is desirable to maintain the concentration of a solution at a predetermined value. Heretofore it has proved difficult to detect or measure variations in such solutions to the degree of accuracy and reliability required, chiefly for one or more of four reasons, namely (1) contamination of the electrodes due to the accumulation of gas bubbles, grease or saponified matter in recesses in the cell structure; (2) insufficient compensation for temperature changes; (3) short effective life of the cell due to deterioration of electrodes or of insulation by contact with the solution; and (4) partial shortcircuiting of components within the cell due to improper sealing and resultant leakage.

The foregoing disadvantages of prior conductivity cells are overcome by means of the present invention which also provides additional advantages which will be evident from the following description considered in connection with the drawings, wherein:

Fig. 1 is a plan view, in section, of the conductivity cell in accordance with the invention;

Fig. 2 is a cross-section of the cell taken along the line 2—2 of Fig. 1;

Fig. 3 is a top view of the cell taken along the line 3—3 of Fig. 1; and

Fig. 4 is a circuit diagram showing the connections of the elements of the cell illustrated in the previous figures.

The construction of a conductivity cell in accordance with the present invention, as shown in the drawings, comprises an inner or central electrode and an outer electrode which encloses a portion of the inner electrode, the two being insulated from each other. Referring to Fig. 1, the inner electrode 1 and the outer electrode 2 are preferably formed from nickel or other suitable metal. The outer electrode is of cylindrical shape and encloses an end portion of the inner electrode. On the lower end of the outer electrode an inturned flange 3 is formed and the upper end carries an outturned flange 4. Near the end of electrode 1 which is enclosed within electrode 2 a seat 5 is formed, and above the seat is a shoulder 6. Between seat 5 and flange 3 an insulating sleeve 7 is interposed to insulate the respective electrodes from each other and also to comprise a fluid-tight seal to prevent the entrance of fluid inside of electrode 2. The composition of this insulating sleeve and seal should be selected to suit the conditions under which the conductivity cell is to be employed. For many purposes, including use in connection with washing machines, a suitable material would be a copolymer of polyvinylidene chloride, such as "Saran."

A second insulating piece 8 is also interposed between the two electrodes 1 and 2. This piece, which may be made of moulded phenolic, such as "Bakelite," so as to withstand elevated temperatures without deformation, has a small threaded bore in one end which interconnects with a larger threaded bore in the other end. In the smaller bore is screwed a threaded stud 9 which is formed integrally with the upper end of electrode 1. It should preferably be of large enough cross-section to comprise a good heat conductor so that the end thereof will be at substantially the same temperature as the fluid or solution in which the electrode 1 is immersed. By screwing electrode 1 tightly into insulating piece 8 a connecting wire 10 may be compressed between shoulder 6 and the end surface of piece 8 so as to make good electrical connection with inner electrode 1. To ensure a firm connection it is desirable to include a lock washer 37 between the last-mentioned members. Connecting wire 10 is carried upwardly in the cell assembly through a suitable slot 10a (Fig. 2) cut into the external surface of piece 8.

Against the upper end of stud 9 a compensating resistor unit, or button, 11 is retained with a good heat-conducting contact. It is desirable that this contact between electrode 1 and resistor unit 11 should be of low temperature gradient, such as results from a contact of large area. The purpose of this unit is to compensate for change of temperature of the solution, viz., so that change of solution temperature will not appreciably affect the control circuit, because in the application of the invention here described it is desired that the solution concentration be detected and automatically controlled regardless of the temperature of the fluid. Resistor units having a suitable negative temperature coefficient are commercially available, one such unit being known as "Thermistor." The temperature coefficient should be at least equal to that of the solution, and preferably should be greater because it then becomes possible effectively to adjust the resistance value of the unit by connecting in series therewith an adjustable resistor having a substantially zero coefficient, and in this way select the desired percentage of temperature compensation to be used.

A contact button 12 is pressed against the upper side of resistor unit 11 in order to maintain good thermal contact between unit 11 and stud 9 and to maintain good electrical contact between button 12 and unit 11. This may be achieved by any suitable means such as compression spring 13. One end of this spring presses against the rear of a head formed at the bottom of contact 12, and the other end of the spring is urged downwardly by screw plug 14 which is inserted in the larger threaded bore of insulating piece 8. This plug, which adjusts the spring compression, may be of any suitable material, brass being satisfactory. Contact 12 should be formed of material such that good electrical connection is made with the resistor unit 11, and the construction and arrangement of the elements of the cell should be such that the temperature of unit 11 will follow closely the temperature of the fluid in which the cell is immersed. Under some conditions a contact button effectively of low heat conductivity, viz., of high temperature gradient, will enhance this result. A second connecting wire 15 is connected to contact 12 and extends through the center of the cell structure to a terminal board, later to be described.

Between the upper end of insulating piece 8 and the upper end of outer electrode 2 extends a compression tube 16 having an outside diameter which fits snugly within electrode 2. This tube may conveniently be of any suitable material and is here represented as being of Bakelite. When the conductivity cell structure is assembled, compression tube 16 is pressed downwardly against insulating piece 8 which, in turn, presses shoulder 5 toward flange 3, thus making a tight seal at the point of entry between electrodes 1 and 2.

The upper end of the cell structure terminates in a connecting box or casing which should be substantially watertight. It may be designed as an electrical terminal box suitable to connect with standard conduits. Such a casing, 17, is securely fastened to the upper end of electrode 2, as for example, by means shown in Fig. 1. For this purpose casing 17 is provided with an inturned threaded sleeve 18 having an inside diameter which fits snugly over the outside of electrode 2. This sleeve may be crimped or otherwise secured to the base 19 of the casing. A compression nut 20 screws down on sleeve 18 as a result of which compression tube 16 is urged downwardly and electrode 2 is urged upwardly relative thereto. It is convenient, although not always necessary, to provide a spring washer 21, or the equivalent, between nut 20 and the upper end of compression tube 16. A hole 22 in the top of nut 20 permits connecting wires 10 and 15 to pass into the interior of casing 17.

A terminal board 23, here of disc-shaped insulating material, is supported on base member 19 by means of standards 24 and 25. These standards space the terminal board 23 above the bottom of base member 19 so that it encircles nut 20, a clearance hole of suitable diameter being provided in the center of disc 23 for that purpose.

The arrangement of the terminals on terminal board 23 is shown more clearly in Fig. 3. Terminals A, B, C and X all carry electrical connections. Terminal B connects through metal standard 24 to the base member 19 which, in turn, is firmly connected to outer electrode 2. Terminal A is connected to inner electrode 1 by connecting wire 10. Terminal X is connected through wire 15 to compensating resistor unit 11, and could, if desired, be employed as a terminal point to an external circuit. However, in the particular arrangement illustrated, terminal X is connected to a fourth terminal, C, through a resistor 26, which is here provided to increase, or to adjust the effective circuit resistance of compensating unit 11. Resistors 11 and 26 are represented by reference characters $R_1$ and $R_2$, respectively, in Fig. 1 of our co-pending application for patent above mentioned. Suitable leads in a cable 27 are secured to the appropriate terminals A, B and C for the purpose of making electrical connections to the required external circuits. Cable 27 is anchored by a clamp 28 to terminal board 23. This cable passes through casing 17 in a hole lined with a rubber grommet 29.

Any appropriate means may be provided to secure the conductivity cell above described at the location where it is desired to measure the conductivity of a fluid in which the cell is to be immersed. The drawing illustrates fittings which are well adapted to support the cell structure in the side or top of the wash tank of a dish washing machine so as to be adjustable therein and readily removable. These fittings include a tapered locking sleeve 30 and a locking or compression nut 31 cooperating therewith. A conical rubber compression gasket 32 seals and locks electrode 2 in any desired position. Sleeve 30 passes through a suitable aperture in the wall 33 or other portion of the wash tank and the connection is made firm and watertight by rubber gaskets 34, washers 35 and nut 36. By loosening nut 31 the entire cell may readily be removed for cleaning or replacement, or may be slid longitudinally within the sleeve 30 to permit more or less of the external surface of electrode 2 to be immersed in the solution. The desired adjustment can then be fixed by tightening nut 31.

We claim:

1. In a conductivity cell, a central electrode, an outer electrode of cylindrical shape, an end portion of which encloses an end portion of said central electrode, a seat formed on said central electrode, an inturned flange at one end of said outer electrode proportioned to cooperate with said seat, insulating means interposed between said seat and said flange, a shoulder on said inner electrode, an outturned flange at the other end of said outer electrode, a casing, a terminal board secured to and enclosed by said casing, a threaded sleeve forming a central opening in the bottom of said casing, said sleeve being proportioned to fit around said outer electrode and against said outturned flange, a compression nut cooperating with said threaded sleeve, a compression member extending effectively between the shoulder on said inner electrode and said compression nut, terminals on said terminal board, and connections from said terminals to at least one of said electrodes.

2. In a conductivity cell according to claim 1, a resistor unit having a negative temperature coefficient, means retaining said unit in low-temperature-gradient contact with said inner electrode, and a connection from one of said terminals to said unit, said last-named connection forming a contact with said unit of high electrical conductivity and high temperature gradient.

3. A conductivity cell according to claim 1, which includes a locking sleeve surrounding said outer electrode and in which said cell is movable longitudinally, fluid-sealing means interposed between said locking sleeve and said outer electrode, and means adapted to secure said locking sleeve in a fluid container.

4. In a conductivity cell, two electrodes adapted to be placed in contact with a fluid, said electrodes comprising a rod-shaped inner electrode and a fluid-tight outer electrode enclosing one end of said inner electrode, the other end thereof extending beyond said outer electrode, insulating and fluid-sealing means interposed between said electrodes at the region where the inner electrode enters the outer electrode, a plurality of electric connecting means extending along and disposed within said outer electrode, one of said connecting means terminating in a connection to said inner electrode at a portion thereof enclosed by said outer electrode, contact means terminating another of said connecting means, a compensating resistor unit disposed between said contact means and the enclosed end of the inner electrode, and resilient means so disposed as to maintain said contact, said resistor unit and the end of said inner electrode in electric connection.

5. A conductivity cell according to claim 4 in which said contact means and the portion of said resistor unit in contact therewith are proportioned so that the contact area therebetween is small, and said enclosed end of said inner electrode and the portion of said resistor unit in contact therewith are proportioned so that the contact area therebetween is comparatively large, whereby the thermal conductivity between said inner electrode and said unit is greater than the thermal conductivity between said unit and said contact means.

6. In a conductivity cell adapted to be immersed in a fluid, a rod-shaped metallic electrode, a cylindrical electrode of imperforate metal, one end of said rod-shaped electrode being adapted to be immersed in a fluid and the other end thereof being enclosed within a first end of said cylindrical electrode so as to be sealed with respect to the fluid, fluid-tight insulating means sealing the joint between said rod-shaped electrode and said cylindrical electrode, a temperature-compensating resistor unit disposed within the sealed end of said cylindrical electrode, retaining means urging said resistor unit into continuous thermal and electrical contact with a portion of one of said electrodes within said sealed end of said cylindrical electrode, terminals disposed at the second end of said cylindrical electrode, and connection means connecting said rod-shaped electrode and said resistor unit to said terminals.

7. In a conductivity cell according to claim 6, clamping means adapted to secure said cell in the wall of a fluid container, said clamping means being secured to said cylindrical electrode at a point thereon between said second end thereof and said resistor unit, whereby to immerse said cell in fluid at least as far as said unit.

8. In a conductivity cell according to claim 1, a resistor unit, means retaining said unit in low-temperature-gradient contact with said inner electrode, and a connection from one of said terminals to said unit.

9. In a conductivity cell, two electrodes adapted to be placed in contact with a fluid, said electrodes comprising an inner electrode and an imperforate cylindrical outer electrode, said outer electrode being disposed so as to enclose only one end of said inner electrode, the other end of said inner electrode extending beyond and being unenclosed by said outer electrode so as to be adapted to contact a fluid, insulating and fluid-sealing means interposed between said electrodes and located at the junction of the enclosed and unenclosed end portions of said inner electrode, a compensating resistor unit, means retaining said unit in thermal contact with a part of said enclosed portion of said inner electrode, and connecting means sealed within and extending substantially throughout the length of said outer electrode for connecting said resistor unit and said inner electrode separately to an external circuit.

10. In a conductivity cell, a central electrode, an outer electrode of tubular shape, an end portion of which encloses an end portion of said central electrode, a seat formed on said central electrode, an inturned flange at one end of said outer electrode proportioned to cooperate with said seat, insulating fluid-sealing means interposed between said seat and said flange, a shoulder on said inner electrode, an outturned flange at the other end of said outer electrode, compression means including a resilient member and at least one insulating member extending along the inside of said outer electrode effectively from said shoulder on the inner electrode to the end of the outer electrode at which said outturned flange is disposed, and mechanical means cooperating with said outturned flange and the end of said compression means adjacent thereto effective to maintain said compression means under compression and said outer electrode under tension.

11. In a conductivity cell, a first electrode adapted to be immersed in a fluid, said electrode being of material having high thermal and electric conductivity, a connector adapted to connect said electrode to an external circuit, contact means terminating said connector, a contact surface on said electrode, a compensating resistor unit having first and second contact areas, the first of which is in contact with said contact surface and the second of which is in contact with said contact means, the nature and proportions of the contact between said contact surface and said first contact area being such as to provide high electrical conductivity and high thermal conductivity, and the nature and proportions of the contact between said second contact area and said contact means being such as to provide high electrical conductivity and thermal conductivity considerably less than that of said high thermal conductivity, a second electrode of imperforate, fluid-tight electrically conductive material formed as a cylinder, one end of the first electrode being secured within said second electrode so that said second electrode comprises the sole support for the first electrode, insulating and fluid-sealing means separating said electrodes, and fluid-tight mounting means encircling said electrode and adapted to support said second electrode and thereby said first electrode in the wall of a fluid container.

12. A conductivity cell including a first electrode of rod-shaped conducting material, the first end of which is adapted to be immersed in a fluid, a second electrode of imperforate conducting material of cylindrical form, the second end of said first electrode being sealed within a first end of said second electrode, the first end of said first electrode extending beyond said end of said second electrode, fluid-tight insulating means sealing the joint where said first electrode enters said second electrode, said insulating means extending over the surface of said first electrode to form a shield beyond said end of said second electrode, whereby both electrodes are fluidtight throughout their immersible lengths, an electric terminal, a closed terminal box encasing said terminal and secured to and enclosing the second end of said second electrode, insulation means disposed wholly within said second electrode mechanically interlocking said electrodes and extending into said terminal box, said insulation means forming a longitudinal conduit between said first electrode and the inside of said terminal box, and electrical connection means extending from said first electrode through said conduit to said terminal.

GEORGE L. BORELL.
MARCUS I. NYSTUEN.

REFERENCES CITED

The following references are of record in the file of this patent:

UNITED STATES PATENTS

| Number | Name | Date |
|---|---|---|
| 1,912,997 | Parker | June 6, 1933 |
| 2,082,213 | O'Donnell | June 1, 1937 |
| 2,370,609 | Wilson et al. | Feb. 27, 1945 |
| 2,437,134 | Smith | Mar. 2, 1948 |
| 2,450,459 | Thomson | Oct. 5, 1948 |
| 2,456,117 | Feller | Dec. 14, 1948 |